United States Patent
Kuo

(10) Patent No.: US 10,838,566 B2
(45) Date of Patent: Nov. 17, 2020

(54) TOUCH SCREEN INCLUDING ELECTRODE WITH FINGER-SHAPED BRANCHES AND DISPLAY APPARATUS

(71) Applicant: BOE TECHNOLOGY GROUP CO., LTD., Beijing (CN)

(72) Inventor: Tawei Kuo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/391,170

(22) Filed: Apr. 22, 2019

(65) Prior Publication Data

US 2020/0073514 A1 Mar. 5, 2020

(30) Foreign Application Priority Data

Sep. 5, 2018 (CN) .......................... 2018 1 1032745

(51) Int. Cl.
*G06F 3/045* (2006.01)
*G06F 3/044* (2006.01)
*G06F 3/041* (2006.01)

(52) U.S. Cl.
CPC .......... *G06F 3/0448* (2019.05); *G06F 3/0412* (2013.01)

(58) Field of Classification Search
None
See application file for complete search history.

(56) References Cited

U.S. PATENT DOCUMENTS 8,593,410 B2 11/2013 Hong et al.
10,387,705 B2 * 8/2019 Liu ...................... G06K 9/0002

| 2009/0194344 A1 * | 8/2009 | Harley | G06F 3/044 178/18.06 |
| 2012/0044193 A1 * | 2/2012 | Peng | G06F 3/0445 345/174 |
| 2013/0113752 A1 * | 5/2013 | Chang | G06F 3/044 345/174 |
| 2013/0278513 A1 * | 10/2013 | Jang | G06F 3/047 345/173 |

(Continued)

OTHER PUBLICATIONS

Examination Report issued in related EP Patent Application No. 19190249.3, dated Sep. 29, 2020.

*Primary Examiner* — Lunyi Lao
*Assistant Examiner* — Kirk W Hermann
(74) *Attorney, Agent, or Firm* — McDermott Will & Emery LLP

(57) ABSTRACT

Embodiments of the present disclosure provide a touch screen and a display apparatus having the touch screen. The touch screen includes: first electrodes, second electrodes and bridging structures. Each first electrode includes: a first electrode body extending in a first direction; and first finger-shaped portions extending from the first electrode body in a second direction crossing the first direction. The second electrodes cross the first electrodes at cross positions, and each second electrode includes: a second electrode body extending in the second direction; finger-shaped branches extending from the second electrode body in the first direction; and at least one second finger-shaped portion extending in the second direction from each finger-shaped branch. The first finger-shaped portions and the second finger-shaped portions form an interdigital structure.

19 Claims, 6 Drawing Sheets

(56) References Cited

U.S. PATENT DOCUMENTS

| | | | |
|---|---|---|---|
| 2014/0009428 A1* | 1/2014 | Coulson | G06F 3/044 345/174 |
| 2014/0022210 A1* | 1/2014 | Wu | G06F 3/0446 345/174 |
| 2014/0168147 A1* | 6/2014 | Huang | G06F 3/0418 345/174 |
| 2014/0192027 A1* | 7/2014 | Ksondzyk | G06F 3/044 345/178 |
| 2014/0313169 A1* | 10/2014 | Kravets | H03K 17/962 345/178 |
| 2014/0375902 A1* | 12/2014 | Westhues | G02F 1/13338 349/12 |
| 2016/0011691 A1* | 1/2016 | Shinkai | G06F 3/044 345/174 |
| 2016/0054836 A1* | 2/2016 | Wu | G06F 3/044 345/173 |
| 2016/0149572 A1* | 5/2016 | Chen | G06F 3/044 345/173 |
| 2017/0185185 A1* | 6/2017 | Yoo | G06F 3/044 |
| 2017/0192544 A9* | 7/2017 | Huang | H05K 3/4685 |
| 2018/0224964 A1* | 8/2018 | Church | G06F 3/047 |
| 2018/0224965 A1* | 8/2018 | Church | G06F 3/044 |
| 2018/0224966 A1* | 8/2018 | Church | G06F 3/03547 |
| 2018/0224967 A1 | 8/2018 | Church et al. | |
| 2018/0224968 A1* | 8/2018 | Church | G06F 3/0412 |
| 2019/0050097 A1* | 2/2019 | Mugiraneza | G06F 3/0446 |
| 2019/0087031 A1* | 3/2019 | Xie | G06F 3/044 |
| 2019/0196620 A1* | 6/2019 | Shu | G06F 3/0445 |
| 2019/0220114 A1* | 7/2019 | Shu | G06F 3/0446 |
| 2020/0167038 A1* | 5/2020 | Lee | G06F 3/0443 |

\* cited by examiner

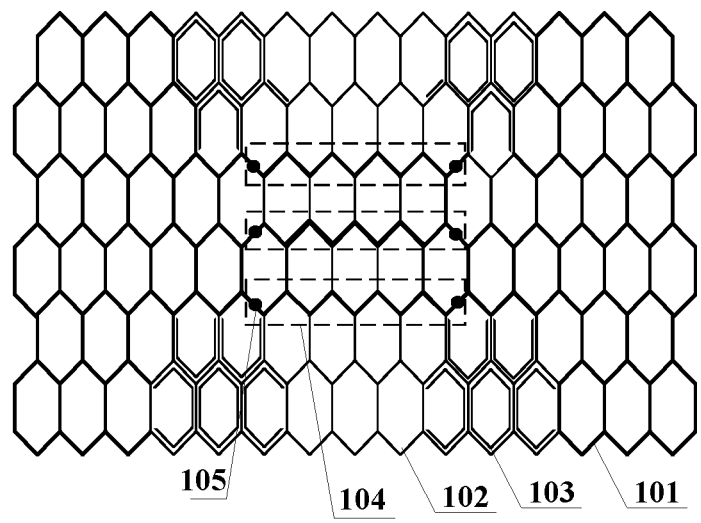
FIG. 3
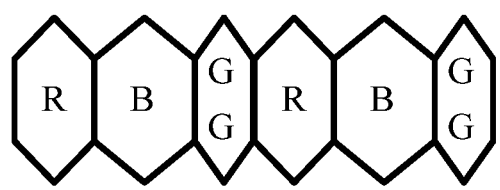
FIG. 4
| R | G | B | R | G | B | R | G | B |
|---|---|---|---|---|---|---|---|---|
| R | G | B | R | G | B | R | G | B |
FIG. 5

FIG. 6
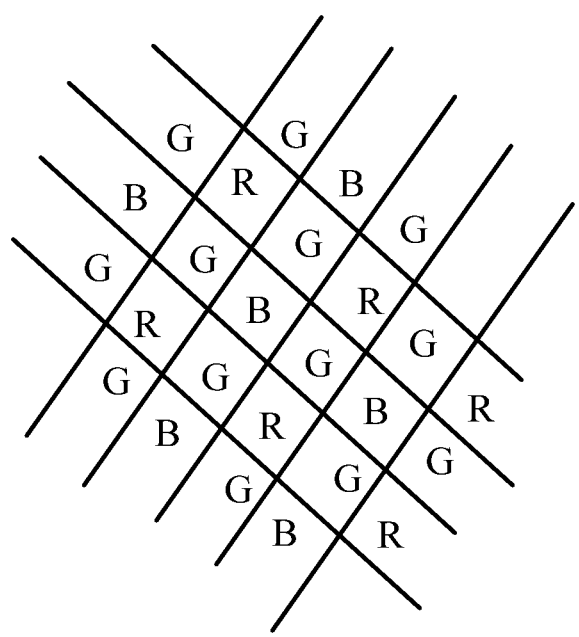
FIG. 7
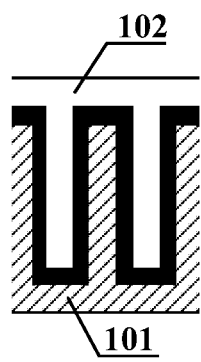
FIG. 8

TOUCH SCREEN INCLUDING ELECTRODE WITH FINGER-SHAPED BRANCHES AND DISPLAY APPARATUS

CROSS-REFERENCE TO RELATED APPLICATION

This application claims the benefit of Chinese Patent Application No. 201811032745.0, filed with the State Intellectual Property Office of China on Sep. 5, 2018, the whole disclosure of which is incorporated herein by reference.

TECHNICAL FIELD

Embodiments of the present disclosure relate to a touch screen and a display apparatus having the touch screen.

BACKGROUND

In designing a touch screen, the touch screen is expected to have a higher sensitivity. When the sensitivity is higher, a user experience is increased.

SUMMARY

Embodiments of the present disclosure provide a touch screen comprising: a plurality of first electrodes each comprising: a first electrode body extending in a first direction; and a plurality of first finger-shaped portions extending from the first electrode body in a second direction crossing the first direction; a plurality of second electrodes crossing the plurality of first electrodes at a plurality of cross positions, wherein each of the plurality of second electrodes comprises: a second electrode body extending in the second direction; a plurality of finger-shaped branches extending from the second electrode body in the first direction; and at least one second finger-shaped portion extending in the second direction from each of the plurality of finger-shaped branches, and wherein the first finger-shaped portions of the plurality of first electrodes and the second finger-shaped portions of the plurality of second electrodes form an interdigital structure; and a plurality of bridging structures, wherein each of the plurality of second electrodes is continuous at the cross positions, and each of the plurality of first electrodes comprises a plurality of first electrode segments which are separate from one another at the cross positions and which are connected with one another through the bridging structures; or wherein each of the plurality of first electrodes is continuous at the cross positions, and each of the plurality of second electrodes comprises a plurality of second electrode segments which are separate from one another at the cross positions and which are connected with one another through the bridging structures.

According to an embodiment of the present disclosure, the plurality of first electrodes are drive electrodes, and the plurality of second electrodes are sense electrodes; or the plurality of second electrodes are drive electrodes, and the plurality of first electrodes are sense electrodes.

According to an embodiment of the present disclosure, the touch screen further comprises: a dummy electrode disposed between the plurality of first electrodes and the plurality of second electrodes.

According to an embodiment of the present disclosure, the plurality of first electrodes, the plurality of second electrodes, and the dummy electrode each have a mesh structure.

According to an embodiment of the present disclosure, the first finger-shaped portions of the plurality of first electrodes, and the second finger-shaped portions of the plurality of second electrodes each have a width greater than two meshes; and the dummy electrode has a width greater than one mesh.

According to an embodiment of the present disclosure, in the mesh structure, each mesh corresponds to a single sub-pixel or a group of sub-pixels, and an orthogonal projection of the single sub-pixel or the group of sub-pixels on a plane where the meshes are located is within a corresponding one of the meshes.

According to an embodiment of the present disclosure, the meshes in the mesh structure comprise hexagonal meshes.

According to an embodiment of the present disclosure, each of the plurality of bridging structures comprises a zigzag bridge connection extending along the hexagonal meshes.

According to an embodiment of the present disclosure, there is a space between the first finger-shaped portions of the plurality of first electrodes and the second finger-shaped portions of the plurality of second electrodes in a plane where the plurality of first electrodes and the plurality of second electrodes are located.

According to an embodiment of the present disclosure, the first electrode bodies of the plurality of first electrodes and the second electrode bodies of the plurality of second electrodes cross each other at the plurality of cross positions; and the second electrode body of each of the plurality of second electrodes is continuous at the cross positions, and the first electrode body of each of the plurality of first electrodes comprises a plurality of first electrode body segments which are separate from one another at the cross positions and which are connected with one another through the bridging structures; or the first electrode body of each of the plurality of first electrodes is continuous at the cross positions, and the second electrode body of each of the plurality of second electrodes comprises a plurality of second electrode body segments which are separate from one another at the cross positions and which are connected with one another through the bridging structures.

According to an embodiment of the present disclosure, in each of the plurality of first electrodes, the plurality of first finger-shaped portions extend towards opposite directions in the second direction from both sides, in the second direction, of the first electrode body, respectively; and in each of the plurality of second electrodes, the at least one second finger-shaped portion extending in the second direction from one side, in the second direction, of a 2n-1th one of the plurality of finger-shaped branches, and the at least one second finger-shaped portion extending in the second direction from one side, in the second direction, of a 2nth one of the plurality of finger-shaped branches extend towards each other, and n is a positive integer.

According to an embodiment of the present disclosure, in each of the plurality of second electrodes, each of the plurality of finger-shaped branches comprises two finger-shaped branch segments which extend away from each other in the first direction from both sides, in the first direction, of the second electrode body.

According to an embodiment of the present disclosure, in each of the plurality of second electrodes, the two finger-shaped branch segments of each of the plurality of finger-shaped branches are disposed symmetrically with respect to the second electrode body.

According to an embodiment of the present disclosure, assuming that the at least one second finger-shaped portion extending in the second direction from the one side, in the second direction, of the 2n-1th one of the plurality of finger-shaped branches of each of the plurality of second electrodes is a 2n-1th finger-shaped portion set, and assuming that the at least one second finger-shaped portion extending in the second direction from the one side, in the second direction, of the 2nth one of the plurality of finger-shaped branches of the each of the plurality of second electrodes is a 2nth finger-shaped portion set, one of the first electrode bodies of the plurality of first electrodes is located between the 2n-1th finger-shaped portion set and the 2nth finger-shaped portion set of each of the plurality of second electrodes in the second direction.

According to an embodiment of the present disclosure, the first electrode bodies of the plurality of first electrodes and the finger-shaped branches of each of the plurality of second electrodes are alternately arranged in the second direction.

According to an embodiment of the present disclosure, every two adjacent ones of the plurality of first electrodes are a set of first electrodes, every two adjacent ones of the plurality of second electrodes are a set of second electrodes, a crossing of the set of first electrodes and the set of second electrodes is a touch unit, and in each touch unit, only four bridging structures are disposed.

According to an embodiment of the present disclosure, in each of the plurality of second electrodes, the at least one second finger-shaped portion extending in the second direction from one side, in the second direction, of a 2n-1th one of the plurality of finger-shaped branches, and the at least one second finger-shaped portion extending in the second direction from one side, in the second direction, of a 2nth one of the plurality of finger-shaped branches extend towards each other, the 2n-1th finger-shaped branch, the 2nth finger-shaped branch, the second finger-shaped portions extending respectively from the 2n-1th finger-shaped branch and the 2nth finger-shaped branch towards each other, and a segment of the second electrode body between the 2n-1th finger-shaped branch and the 2nth finger-shaped branch in the second direction constitute a second electrode unit of the second electrode, and n is a positive integer; in each of the plurality of first electrodes, the plurality of first finger-shaped portions extend towards opposite directions in the second direction from both sides, in the second direction, of the first electrode body respectively, ones of the plurality of first finger-shaped portions extending towards the opposite directions from the first electrode body and forming an interdigital structure together with the second finger-shaped portions of the second electrode unit of the second electrode, and a segment of the first electrode body between the ones of the plurality of first finger-shaped portions in the second direction constitute a first electrode unit of the first electrode; and the first electrode unit and the second electrode unit forming the interdigital structure constitute a sub-touch unit, and in each sub-touch unit, only one bridging structure is disposed.

According to an embodiment of the present disclosure, a first finger-shaped branch of one of every two adjacent ones of the plurality of second electrodes and a second finger-shaped branch, adjacent to the first finger-shaped branch in the first direction, of the other of the two adjacent second electrodes constitute a pair of connectable finger-shaped branches, and in each touch unit, at least one pair of connectable finger-shaped branches of the two adjacent second electrodes are electrically connected to each other.

According to an embodiment of the present disclosure, the touch screen further comprises: a light emitting unit comprising an organic light-emitting diode, wherein the bridging structure is disposed between the first and second electrodes and the light emitting unit; or a light emitting unit comprising an organic light-emitting diode, wherein the bridging structure is disposed on a side of the plurality of first electrodes and the plurality of the second electrodes away from the light emitting unit.

Embodiments of the present disclosure provide a display apparatus comprising the touch screen.

BRIEF DESCRIPTION OF THE DRAWINGS

Other features, objects and advantages of embodiments of the present disclosure will become more apparent and are more readily appreciated by reading detailed description of non-limiting examples in conjunction with accompanying drawings in which:

FIG. 3 is a schematic view showing a structure of a touch screen having a mesh structure according to an embodiment of the present disclosure;

FIGS. 4-7 are schematic diagrams showing configurations of meshes and sub-pixels corresponding to each other, according to embodiments of the present disclosure;

FIG. 8 is a schematic view showing an etched space between first and second electrodes according to an embodiment of the present disclosure;

DETAILED DESCRIPTION

Figure 1:
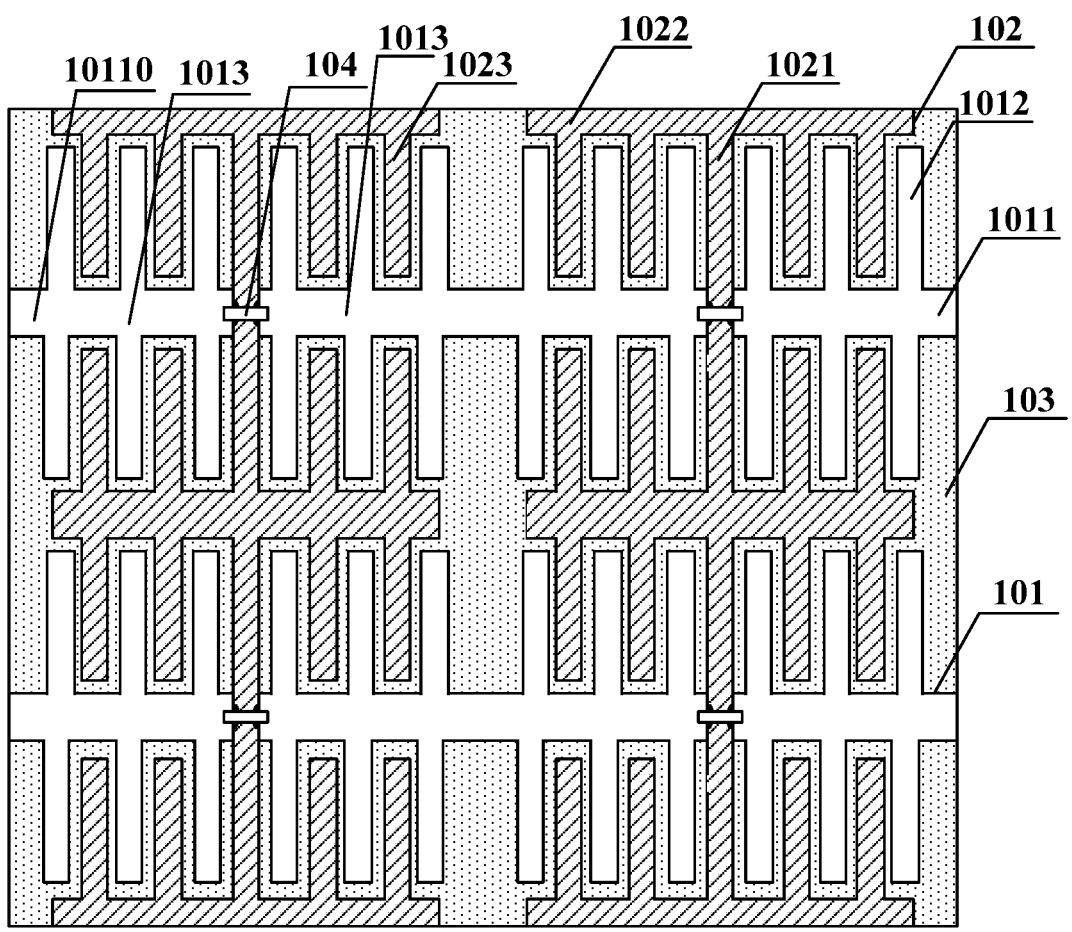
FIGS. 1 and 2 are schematic views showing structures of touch screens according to embodiments of the present disclosure.

A further description of the disclosure will be made in detail as below with reference to exemplary embodiments of the present disclosure taken in conjunction with the accompanying drawings. It should be understood that the embodiments set forth herein are only used to describe and explain the present disclosure and should not be construed to limit the present disclosure. In addition, it should also be noted that only portions relating to the present disclosure are shown in the drawings for the convenience of description.

It is to be noted that the embodiments of the present disclosure may be combined with each other unless they conflict and the features in the embodiments of the present disclosure may be combined with each other unless they conflict.

The present disclosure will be described in detail as below with reference to the accompanying drawings in combination with the embodiments.

Figure 2:
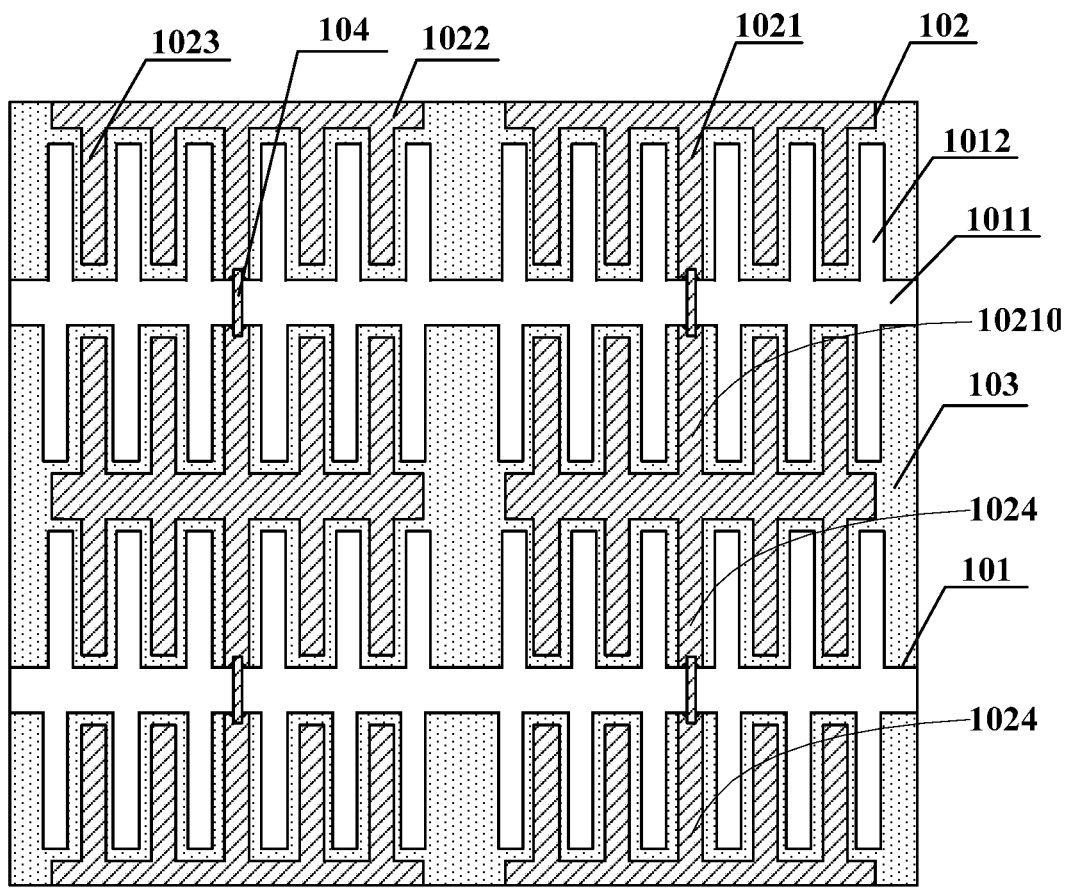

Referring to FIGS. 1 and 2, a touch screen according to embodiments of the present disclosure includes: a plurality of first electrodes 101, a plurality of second electrodes 102, and a plurality of bridging structures 104. Each of the plurality of first electrodes 101 includes: a first electrode body 1011 extending in a first direction; and a plurality of first finger-shaped portions 1012 extending from the first electrode body 1011 in a second direction crossing the first direction. The plurality of second electrodes 102 cross the plurality of first electrodes 101 at a plurality of cross positions. Each of the plurality of second electrodes 102 includes: a second electrode body 1021 extending in the second direction; a plurality of finger-shaped branches 1022 extending from the second electrode body 1021 in the first direction; and at least one second finger-shaped portion 1023 extending in the second direction from each of the plurality of finger-shaped branches 1022. The first finger-shaped portions 1012 of the plurality of first electrodes 101 and the second finger-shaped portions 1023 of the plurality of second electrodes 102 form an interdigital structure. Each of the plurality of second electrodes 102 is continuous (or not interrupted) at the cross positions, and each of the plurality of first electrodes 101 includes a plurality of first electrode segments 1013 which are separate from one another at the cross positions and which are connected with one another through the bridging structures 104; or each of the plurality of first electrodes 101 is continuous (or not interrupted) at the cross positions, and each of the plurality of second electrodes 102 includes a plurality of second electrode segments 1024 which are separate from one another at the cross positions and which are connected with one another through the bridging structures 104. The plurality of first electrodes 101 and the plurality of second electrodes 102 constitute touch electrodes.

Referring to FIGS. 1 and 2, the touch screen according to an example shown in FIGS. 1 and 2 of the present disclosure includes: a plurality of first electrodes 101 and a plurality of second electrodes 102.

As shown in FIG. 1, each of the plurality of first electrodes 101 includes: a first electrode body 1011, and a plurality of first finger-shaped portions 1012 extending from the first electrode body 1011 in a second direction. Each of the plurality of second electrodes 102 includes: a second electrode body 1021; a plurality of finger-shaped branches 1022 extending from the second electrode body 1021 in a first direction; and at least one second finger-shaped portion 1023 extending in the second direction from each of the plurality of finger-shaped branches 1022. The first finger-shaped portions 1012 of the first electrodes and the second finger-shaped portions 1023 of the second electrodes form an interdigital structure. At cross positions where the first electrodes 101 and the second electrodes 102 cross each other, the first electrode segments 1013 of the first electrodes 101 are connected with one another through bridging structures 104, or the second electrode segments 1024 of the second electrodes 102 are connected with one another through the bridging structures 104.

The first finger-shaped portions 1012 of the first electrodes 101 are located in slots formed by the second finger-shaped portions 1023 of the second electrodes 102, respectively. Likewise, the second finger-shaped portions 1023 of the second electrodes 102 are also located in slots formed by the first finger-shaped portions 1012 of the first electrodes 101, respectively. Therefore, the interdigital structure is formed.

According to embodiments of the present disclosure, the first electrode bodies 1011 and the second electrode bodies 1021 cross each other at the cross positions where the first electrodes 101 and the second electrodes 102 cross each other. Further, other portions of the first electrodes 101 and the second electrodes 102 may also cross each other at the cross positions.

With the interdigital structure shown in FIG. 1, a facing area between the first electrodes 101 and the second electrodes 102 is larger, and a sense between the first electrode 101 and the second electrode 102 is more sensitive, thereby improving a sensitivity of the touch screen.

According to embodiments of the present disclosure, one of the first electrode and the second electrode is a transmitter (Tx) electrode (i.e. a drive electrode), and the other of the first electrode and the second electrode is a receiver (Rx) electrode (i.e. a sense electrode), so that the first electrode and the second electrode cooperate to achieve a touch function. According to embodiments of the present disclosure, the first electrode is a transmitter electrode, and the second electrode is a receiver electrode. Alternatively, the second electrode is a transmitter electrode, and the first electrode is a receiver electrode.

According to embodiments of the present disclosure, the first electrode bodies and the second electrode bodies cross each other. For example, the first electrode bodies and the second electrode bodies may be perpendicular to each other. If the touch screen is rectangular in shape, the first electrode bodies and the second electrode bodies may be perpendicular to each other.

Referring to FIGS. 1 and 2, in embodiments of the present disclosure, the first electrode bodies 1011 of the plurality of first electrodes 101 and the second electrode bodies 1021 of the plurality of second electrodes 102 cross each other at the plurality of cross positions; and the second electrode body 1021 of each of the plurality of second electrodes 102 is continuous at the cross positions, and the first electrode body 1011 of each of the plurality of first electrodes 101 includes a plurality of first electrode body segments 10110 which are separate from one another at the cross positions and which are connected with one another through the bridging structures 104; or the first electrode body 1011 of each of the plurality of first electrodes 101 is continuous at the cross positions, and the second electrode body 1021 of each of the plurality of second electrodes 102 includes a plurality of second electrode body segments 10210 which are separate from one another at the cross positions and which are connected with one another through the bridging structures 104.

Referring to FIGS. 1 and 2, in embodiments of the present disclosure, in each of the plurality of first electrodes 101, the plurality of first finger-shaped portions 1012 extend towards opposite directions in the second direction from both sides, in the second direction, of the first electrode body 1011 respectively; and in each of the plurality of second electrodes 102, the at least one second finger-shaped portion 1023 extending in the second direction from one side, in the second direction, of a 2n-1th one (for example a first finger-shaped branch 1022) of the plurality of finger-shaped branches 1022, and the at least one second finger-shaped portion 1023 extending in the second direction from one side, in the second direction, of a 2nth one (for example a second finger-shaped branch 1022) of the plurality of finger-shaped branches 1022 extend towards each other, and n is a positive integer (for example, 1, 2, 3 . . . ).

Referring to FIGS. 1 and 2, in embodiments of the present disclosure, in each of the plurality of second electrodes 102, each of the plurality of finger-shaped branches 1022 includes two finger-shaped branch segments which extend away from each other in the first direction from both sides, in the first direction, of the second electrode body 1021. For example, in each of the plurality of second electrodes 102, the two finger-shaped branch segments of each of the plurality of finger-shaped branches 1022 are disposed symmetrically with respect to the second electrode body 1021.

Referring to FIGS. 1 and 2, in embodiments of the present disclosure, assuming that the at least one second finger-shaped portion 1023, extending in the second direction from the one side, in the second direction, of the 2n-1th one (for example the first finger-shaped branch 1022) of the plurality of finger-shaped branches 1022 of each of the plurality of second electrodes 102, is a 2n-1th finger-shaped portion set, and assuming that the at least one second finger-shaped portion 1023, extending in the second direction from the one side, in the second direction, of the 2nth one (for example the second finger-shaped branch 1022) of the plurality of finger-shaped branches 1022 of the each of the plurality of second electrodes 102, is a 2nth finger-shaped portion set, one of the first electrode bodies 1011 of the plurality of first electrodes 101 is located between the 2n-1th finger-shaped portion set and the 2nth finger-shaped portion set of each of the plurality of second electrodes 102 in the second direction.

Referring to FIGS. 1 and 2, in embodiments of the present disclosure, the first electrode bodies 1011 of the plurality of first electrodes 101 and the finger-shaped branches 1022 of each of the plurality of second electrodes 102 are alternately arranged in the second direction.

Referring to FIGS. 1-3, in embodiments of the present disclosure, the plurality of first electrodes 101 and the plurality of second electrodes 102 each have a mesh structure.

Referring to FIGS. 1 and 2, in embodiments of the present disclosure, the touch screen further includes: a dummy electrode 103 disposed between the plurality of first electrodes 101 and the plurality of second electrodes 102.

Referring to FIG. 3, in embodiments of the present disclosure, the first finger-shaped portions 1012 of the plurality of first electrodes 101, and the second finger-shaped portions 1023 of the plurality of second electrodes 102 each have a width greater than two meshes; and the dummy electrode has a width greater than one mesh.

As shown in FIG. 1, according to embodiments of the present disclosure, a dummy electrode (i.e. a floating pattern or a dummy pattern) 103 may be disposed between the first electrodes and the second electrodes. The dummy electrode is located between the first electrodes and the second electrodes, and there is a gap between the dummy electrode and the first electrodes, there is a gap between the dummy electrode and the second electrodes, and the dummy electrode is not in contact with the first electrodes and the second electrodes. All of the first electrodes, the second electrodes, and the dummy electrode may be formed of a metal mesh. If the mesh structures of the first electrodes, the second electrodes, and the dummy electrode are made of the metal mesh, the dummy electrode may be disposed between the first electrodes and the second electrodes. As shown in FIG. 3, the mesh structure shown in FIG. 3 is only a portion of the structure shown in FIG. 1 which has the bridging structure. In FIG. 3, the thicker line indicates the first electrodes 101, the thinner line indicates the second electrodes 102, and the double line or the triple line indicates the dummy electrode 103. Referring to FIG. 1, at the cross positions where the first electrodes and the second electrodes cross each other, the second electrode body 1021 of each of the second electrodes is continuous, and first electrode segments 1013 of each of the first electrodes are separate from one another and are connected with one another through the bridging structures 104. FIG. 3 shows three bridging lines as indicated by the dashed box. The bridging lines connect the first electrode segments 1013 of each of the first electrodes to one another through via holes 105. According to embodiments of the present disclosure, each of the first electrode body, the first finger-shaped portion, the second electrode body, and the second finger-shaped portion has a width greater than two meshes as indicated by the thicker line and the thinner line in FIG. 3. The dummy electrode between the first finger-shaped portions of the first electrodes and the second finger-shaped portions of the second electrodes has a width greater than one mesh. Here, it is only a visual measuring method that the width of the electrode is measured in the number of the mesh. However, it is not necessary that the electrode must correspond to one or more complete meshes. The electrode may include an incomplete mesh as indicated by the double line or the triple line in FIG. 3. According to an example of the present disclosure, the meshes correspond in position to sub-pixels. Therefore, the greater a resolution is, the denser the meshes are, and the more the number of the meshes to which the width of each of the first electrode body, the first finger-shaped portion, the second electrode body, the second finger-shaped portion, and the dummy electrode corresponds is. According to embodiments of the present disclosure, even if the resolution is lower, the width of each of the first electrode body, the first finger-shaped portion, the second electrode body, and the second finger-shaped portion is greater than two meshes, thereby ensuring a stability of an electric connection. The meshes shown in FIG. 3 are hexagonal meshes. In this case, each of the bridging structures is specifically a zigzag bridge connection extending along the hexagonal meshes, so that an overlap area between the bridging structure and the touch electrode is smaller, and a sensing capacity of the touch electrode is larger.

According to embodiments of the present disclosure, in the mesh structure, the meshes correspond in position to the sub-pixels. Each mesh may correspond to a single sub-pixel or a group of sub-pixels, and an orthogonal projection of the single sub-pixel or the group of sub-pixels on a plane where the meshes are located is within a corresponding one of the meshes. For example, if an RBGB (red, blue, green and blue sub-pixels) arrangement or a Pentile arrangement is adopted, a shape of the mesh may be changed according to the sub-pixels.

For example, as shown in FIG. 4, if a GGRB (green, green, red and blue sub-pixels) arrangement is adopted, the mesh may have a hexagonal shape. A mesh corresponding to a blue sub-pixel B is biggest, a mesh corresponding to a red sub-pixel R is smaller than the mesh corresponding to the blue sub-pixel B, and two green sub-pixels G each are smallest and are located in the same mesh.

As shown in FIGS. 5 and 6, if a real RGB (red, green and blue sub-pixels) arrangement is adopted, the mesh may have a rectangular shape. In the arrangement, each pixel has three sub-pixels: red, green and blue sub-pixels R, G and B, and each of the three sub-pixels corresponds to a single mesh. In FIG. 5, the red, green and blue sub-pixels R, G and B are arranged in sequence, and in FIG. 6, each pixel includes two blue sub-pixels B which are located in the same mesh.

As shown in FIG. 7, if an RBGB (red, blue, green and blue sub-pixels) arrangement of a Pentile RGB (red, green and blue sub-pixels) arrangement is adopted, the mesh has a rectangular shape or a rhombic shape. A red sub-pixel R is disposed in every other mesh in an odd-numbered row and a blue sub-pixel B is disposed in every other mesh in an even-numbered row, or the red sub-pixel R is disposed in every other mesh in the even-numbered row and the blue sub-pixel B is disposed in every other mesh in the odd-numbered row. The red sub-pixel R and the blue sub-pixel B are not adjacent to each other. The green sub-pixels G are disposed in all of the other meshes.

Referring to FIG. 8, in embodiments of the present disclosure, there is a space between the first finger-shaped portions 1012 of the plurality of first electrodes 101 and the second finger-shaped portions 1023 of the plurality of second electrodes 102 in a plane where the plurality of first electrodes 101 and the plurality of second electrodes 102 are located.

As shown in FIG. 8, according to embodiments of the present disclosure, in the interdigital structure, there may also be an etched space between the first and second electrodes. There is no dummy electrode between the first finger-shaped portions of the first electrodes and the second finger-shaped portions of the second electrodes in the plane where the first electrodes and the second electrodes are located, i.e. in a touch layer where the first electrodes and the second electrodes are located. Thereby, the sensing capacity of the touch electrode can be remarkably increased.

Referring to FIGS. 1 and 2, in embodiments of the present disclosure, every two adjacent ones of the plurality of first electrodes 101 are a set of first electrodes 101, every two adjacent ones of the plurality of second electrodes 102 are a set of second electrodes 102, a crossing of the set of first electrodes 101 and the set of second electrodes 102 is a touch unit, and in each touch unit, only four bridging structures 4 are disposed.

In embodiments of the present disclosure, in order to reduce a resistance of the electrodes, two adjacent first electrodes and/or two adjacent second electrodes may be connected. Specifically, every two adjacent first electrodes are a set of first electrodes which are connected to each other in a non-display area, and/or every two adjacent second electrodes are a set of second electrodes which are connected to each other in the non-display area.

In the embodiments of the present disclosure, the non-display area may be specifically an edge of the screen, which corresponds to ends of both the first electrode bodies and the second electrode bodies, i.e. an edge of the touch region.

In embodiments of the present disclosure, in order to further improve a connectional reliability, two adjacent electrodes may be connected to each other at their finger-shaped branches.

Figure 9:
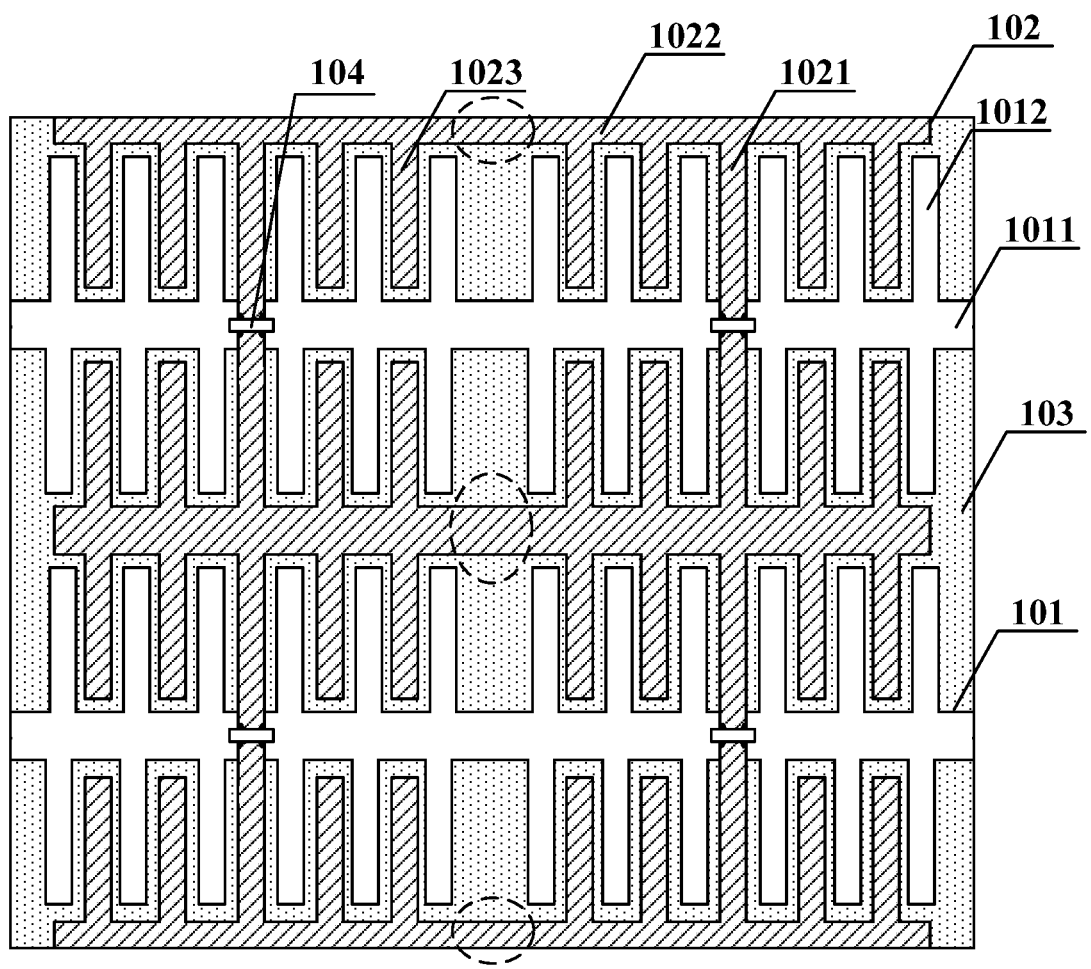
FIG. 9 is a schematic view showing electric connections of three pairs of connectable finger-shaped branches of two adjacent second electrodes according to an embodiment of the present disclosure.

Referring to FIG. 9, in embodiments of the present disclosure, a first finger-shaped branch 1022 of one of every two adjacent ones of the plurality of second electrodes 102 and a second finger-shaped branch 1022, adjacent to the first finger-shaped branch 1022 in the first direction, of the other of the two adjacent second electrodes 102 constitute a pair of connectable finger-shaped branches 1022, and in each touch unit, at least one pair of connectable finger-shaped branches 1022 of the two adjacent second electrodes 102 are electrically connected to each other, as indicated by the portions surrounded by the dashed lines in FIG. 9. For example, in each touch unit, each pair of connectable finger-shaped branches 1022 of three or four pairs of connectable finger-shaped branches 1022 of every two adjacent ones of the plurality of second electrodes 102 are electrically connected to each other, as indicated by the portions surrounded by the dashed lines in FIG. 9.

FIG. 9 shows a single touch unit in which three pairs of connectable finger-shaped branches 1022 of every two adjacent ones of the plurality of second electrodes 102 are electrically connected to each other. The portions surrounded by the dashed lines in FIG. 9 are parts electrically connecting the finger-shaped branches to each other.

In the embodiments of the present disclosure, in each touch unit, four bridging structures are disposed. In other words, the bridging structures are disposed only at the cross positions where the first electrode bodies and the second electrode bodies cross each other, thereby obtaining a greater sensing capacity of the touch electrode. If a bridge connection is added at other cross positions, for example at the first finger-shaped portions of the first electrodes and the second finger-shaped portions of the second electrodes, the sensing capacity of the touch electrode and a sensing sensitivity will be reduced.

In each touch unit, the first electrodes are connected by four bridging structures, so that the resistance can be effectively reduced. Thereby, the touch electrode can be applied to a touch screen having a larger area.

In the embodiments of the present disclosure, the crossing of the set of first electrodes 101 and the set of second electrodes 102 is the single touch unit. For example, the portion of the touch electrode in the range as shown in FIG. 1 is a single touch unit.

If one set of first electrodes include two first electrodes and one set of second electrodes include two second electrodes, then one touch unit includes four sub-touch units. A crossing of one first electrode and one second electrode is one sub-touch unit. In each sub-touch unit, there is one cross position where the first electrode body and the second electrode body cross each other. At the one cross position, the first electrode body segments 10110 of the first electrode body are connected to each other through a bridging structure, or the second electrode body segments 10210 of the second electrode body are connected to each other through a bridging structure.

Specifically, referring to FIGS. 1 and 2, in embodiments of the present disclosure, in each of the plurality of second electrodes 102, the at least one second finger-shaped portion 1023 extending in the second direction from one side, in the second direction, of a 2n-1th one (for example a first finger-shaped branch 1022) of the plurality of finger-shaped branches 1022, and the at least one second finger-shaped portion 1023 extending in the second direction from one side, in the second direction, of a 2nth one (for example a second finger-shaped branch 1022) of the plurality of finger-shaped branches 1022 extend towards each other. In each of the plurality of second electrodes 102, the 2n-1th finger-shaped branch 1022, the 2nth finger-shaped branch 1022, the second finger-shaped portions 1023 extending respectively from the 2n-1th finger-shaped branch 1022 and the 2nth finger-shaped branch 1022 towards each other, and a segment of the second electrode body 1021 between the 2n-1th finger-shaped branch 1022 and the 2nth finger-shaped branch 1022 in the second direction constitute a second electrode unit of the second electrode 102, and n is a positive integer. In each of the plurality of first electrodes 101, the plurality of first finger-shaped portions 1012 extend towards opposite directions in the second direction from both sides, in the second direction, of the first electrode body 1011 respectively, ones of the plurality of first finger-shaped portions 1012 extending towards the opposite directions from the first electrode body 1011 and forming an interdigital structure together with the second finger-shaped portions 1023 of the second electrode unit of the second electrode 102, and a segment of the first electrode body 1011 between the ones of the plurality of first finger-shaped portions 1012 in the second direction constitute a first electrode unit of the first electrode 101; and the first electrode unit and the second electrode unit forming the interdigital structure constitute a sub-touch unit, and in each sub-touch unit, only one bridging structure is disposed. In each second electrode 102, two finger-shaped branches 1022 of each second electrode unit are connected to each other through the second electrode body 1021, and two second electrode units adjacent to each other in the second direction are connected together through two integrated adjacent finger-shaped branches 1022 of the two adjacent second electrode units. In each first electrode 101, two first electrode units adjacent to each other in the first direction are connected together through the first electrode body 1011.

Referring to FIGS. 1 and 2, in embodiments of the present disclosure, the sub-touch units are arranged in a matrix. Sub-touch units in two adjacent columns and in two adjacent rows constitute a touch unit. In each sub-touch unit, only one bridging structure is disposed, and in each touch unit, only four bridging structures are disposed.

As shown in FIGS. 1-3, at the cross positions where the first electrodes and the second electrodes cross each other, the first electrode segments 1013 or the first electrode body segments 10110 of each of the first electrodes are connected with one another through the bridging structures 104, or the second electrode segments 1024 or the second electrode body segments 10210 of each of the second electrodes are connected with one another through the bridging structures 104.

Figure 10:
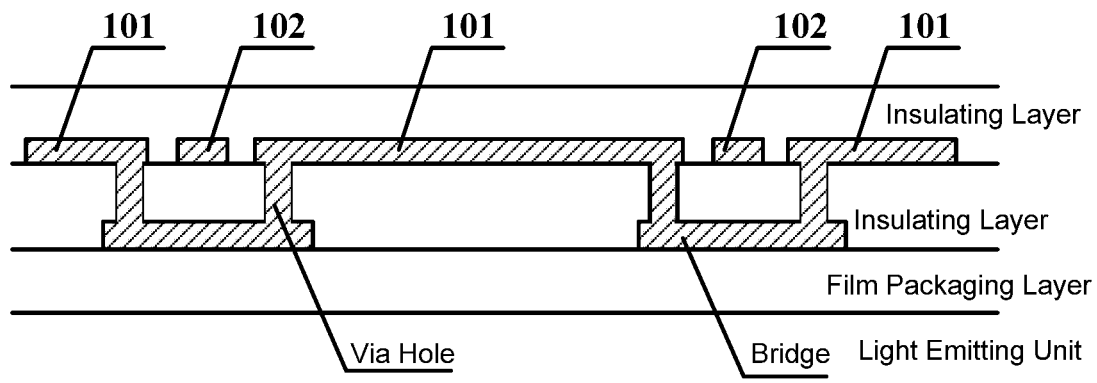
FIGS. 10-11 are schematic sectional views of bridging structures of touch screens according to embodiments of the present disclosure.
Figure 11:
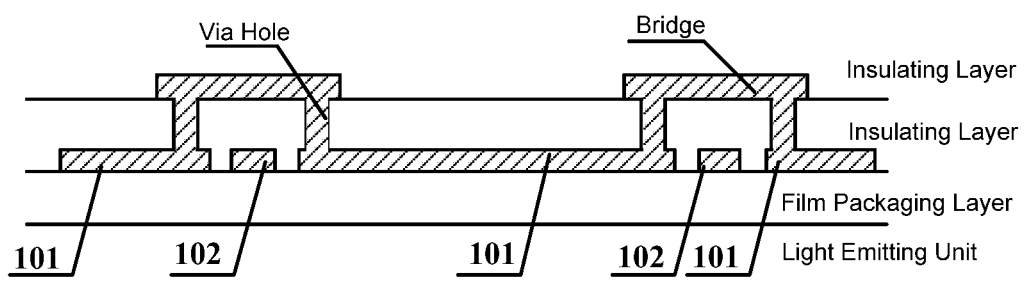

The touch screen may further include a light emitting unit. The light emitting unit may be an organic light-emitting diode (OLED). In this case, the light emitting unit includes a cathode, a light emitting layer and an anode. As shown in FIGS. 10 and 11, the bridging structure 104 connecting the first electrode is taken as an example. The bridging structure may be disposed near the light emitting unit under a plane where the first electrodes and the second electrodes are located as shown in FIG. 10, or may also be disposed away from the light emitting unit over the plane where the first electrodes and the second electrodes are located as shown in FIG. 11. In the case where the bridging structure is disposed near the light emitting unit, i.e. the bridging structure is disposed between the touch electrode and the light emitting unit, the bridging structure is located between the touch electrode and the cathode, so that a distance between the touch electrode and the cathode of the light emitting unit can be increased, a coupling capacitance generated between the touch electrode and the cathode can be decreased and thus a performance of the touch screen can be improved.

Of course, the touch electrode may also be disposed between the bridging structure and the light emitting unit according to actual conditions. In other words, the bridging structure is located on a side of the touch electrode away from the cathode. In this case, the touch electrode is located between the bridging structure and the cathode, as shown in FIG. 11. With such a design, the touch electrode can be flatter, thereby improving a stability of a touch operation.

Embodiments of the present disclosure further accordingly provide a display apparatus including the touch screen according to the embodiments of the present disclosure. The display apparatus may be a flexible display apparatus, an OLED display apparatus, an active matrix organic light emitting diode (AMOLED) display apparatus, a flexible OLED display apparatus, or a flexible AMOLED display apparatus.

The embodiments of the present disclosure provide a touch screen and a display apparatus having the touch screen. The touch screen includes: a plurality of first electrodes and a plurality of second electrodes. Each of the plurality of first electrodes includes: a first electrode body, and a plurality of first finger-shaped portions extending from the first electrode body in a second direction; and each of the plurality of second electrodes includes: a second electrode body; a plurality of finger-shaped branches extending from the second electrode body in a first direction; and at least one second finger-shaped portion extending in the second direction from each of the plurality of finger-shaped branches. The first finger-shaped portions of the first electrodes and the second finger-shaped portions of the second electrodes form an interdigital structure. At the cross positions where the first electrodes and the second electrodes cross each other, the first electrode segments of each of the first electrodes are connected with one another through bridging structures, or the second electrode segments of each of the second electrodes are connected with one another through the bridging structures. Since the first electrodes and the second electrodes are disposed to have an interdigital structure, a facing area between the first electrodes and the second electrodes is larger, and a sense between the first electrode and the second electrode is more sensitive, thereby improving a sensitivity of the touch screen.

Although some exemplary embodiments of the present disclosure have been shown and described above, it would be appreciated by a person skilled in the art that many modifications or changes may be made therein without departing from the principle and spirit of the present disclosure, the scope of which is defined in the appended claims and their equivalents.

What is claimed is:

1. A touch screen comprising:
a plurality of first electrodes each comprising: a first electrode body extending in a first direction; and a plurality of first finger-shaped portions extending from the first electrode body in a second direction crossing the first direction;
a plurality of second electrodes crossing the plurality of first electrodes at a plurality of cross positions, wherein each of the plurality of second electrodes comprises: a second electrode body extending in the second direction; a plurality of finger-shaped branches extending from the second electrode body in the first direction; and at least one second finger-shaped portion extending in the second direction from each of the plurality of finger-shaped branches, and wherein the first finger-shaped portions of the plurality of first electrodes and the second finger-shaped portions of the plurality of second electrodes form an interdigital structure; and
a plurality of bridging structures, wherein each of the plurality of second electrodes is continuous at the cross positions, and each of the plurality of first electrodes comprises a plurality of first electrode segments which are separate from one another at the cross positions and which are connected with one another through the bridging structures; or wherein each of the plurality of first electrodes is continuous at the cross positions, and each of the plurality of second electrodes comprises a plurality of second electrode segments which are separate from one another at the cross positions and which are connected with one another through the bridging structures,
wherein every two adjacent ones of the plurality of first electrodes are a set of first electrodes, every two adjacent ones of the plurality of second electrodes are a set of second electrodes, and a crossing of the set of first electrodes and the set of second electrodes is a touch unit, and
wherein a first finger-shaped branch of one of every two adjacent ones of the plurality of second electrodes and a second finger-shaped branch, adjacent to the first finger-shaped branch in the first direction, of the other of the two adjacent second electrodes constitute a pair of connectable finger-shaped branches, and in each touch unit, at least one pair of connectable finger-shaped branches from each of the two adjacent second electrodes are directly electrically connected to each other.

2. The touch screen of claim 1, wherein:
the plurality of first electrodes are drive electrodes, and the plurality of second electrodes are sense electrodes; or
the plurality of second electrodes are drive electrodes, and the plurality of first electrodes are sense electrodes.

3. The touch screen of claim 1, further comprising:
a dummy electrode disposed between the plurality of first electrodes and the plurality of second electrodes.

4. The touch screen of claim 3, wherein:
the plurality of first electrodes, the plurality of second electrodes, and the dummy electrode each have a mesh structure.

5. The touch screen of claim 4, wherein:
the first finger-shaped portions of the plurality of first electrodes, and the second finger-shaped portions of the plurality of second electrodes each have a width greater than two meshes; and
the dummy electrode has a width greater than one mesh.

6. The touch screen of claim 4, wherein:
in the mesh structure, each mesh of a plurality of meshes corresponds to a single sub-pixel or a group of sub-pixels, and an orthogonal projection of the single sub-pixel or the group of sub-pixels on a plane where the meshes are located is within a corresponding one of the meshes.

7. The touch screen of claim 6, wherein:
the meshes in the mesh structure comprise hexagonal meshes.

8. The touch screen of claim 7, wherein:
each of the plurality of bridging structures comprises a zigzag bridge connection extending along the hexagonal meshes.

9. The touch screen of claim 1, wherein:
there is a space between the first finger-shaped portions of the plurality of first electrodes and the second finger-shaped portions of the plurality of second electrodes in a plane where the plurality of first electrodes and the plurality of second electrodes are located.

10. The touch screen of claim 1, wherein:
the first electrode bodies of the plurality of first electrodes and the second electrode bodies of the plurality of second electrodes cross each other at the plurality of cross positions; and
the second electrode body of each of the plurality of second electrodes is continuous at the cross positions, and the first electrode body of each of the plurality of first electrodes comprises a plurality of first electrode body segments which are separate from one another at the cross positions and which are connected with one another through the bridging structures; or the first electrode body of each of the plurality of first electrodes is continuous at the cross positions, and the second electrode body of each of the plurality of second electrodes comprises a plurality of second electrode body segments which are separate from one another at the cross positions and which are connected with one another through the bridging structures.

11. The touch screen of claim 1, wherein:
in each of the plurality of first electrodes, the plurality of first finger-shaped portions extend towards opposite directions in the second direction from both sides, in the second direction, of the first electrode body respectively; and in each of the plurality of second electrodes, the at least one second finger-shaped portion extending in the second direction from one side, in the second direction, of a 2n-1th one of the plurality of finger-shaped branches, and the at least one second finger-shaped portion extending in the second direction from one side, in the second direction, of a 2nth one of the plurality of finger-shaped branches extend towards each other, and n is a positive integer.

12. The touch screen of claim 11, wherein:
in each of the plurality of second electrodes, each of the plurality of finger-shaped branches comprises two finger-shaped branch segments which extend away from each other in the first direction from both sides, in the first direction, of the second electrode body.

13. The touch screen of claim 12, wherein:
in each of the plurality of second electrodes, the two finger-shaped branch segments of each of the plurality of finger-shaped branches are disposed symmetrically with respect to the second electrode body.

14. The touch screen of claim 11, wherein:
assuming that the at least one second finger-shaped portion, extending in the second direction from the one side, in the second direction, of the 2n-1th one of the plurality of finger-shaped branches of each of the plurality of second electrodes, is a 2n-1th finger-shaped portion set, and assuming that the at least one second finger-shaped portion, extending in the second direction from the one side, in the second direction, of the 2nth one of the plurality of finger-shaped branches of the each of the plurality of second electrodes, is a 2nth finger-shaped portion set, one of the first electrode bodies of the plurality of first electrodes is located between the 2n-1th finger-shaped portion set and the 2nth finger-shaped portion set of each of the plurality of second electrodes in the second direction.

15. The touch screen of claim 1, wherein:
the first electrode bodies of the plurality of first electrodes and the finger-shaped branches of each of the plurality of second electrodes are alternately arranged in the second direction.

16. The touch screen of claim 1, wherein:
in each touch unit, only four bridging structures are disposed.

17. The touch screen of claim 1, wherein:
in each of the plurality of second electrodes, the at least one second finger-shaped portion extending in the second direction from one side, in the second direction, of a 2n-1th one of the plurality of finger-shaped branches, and the at least one second finger-shaped portion extending in the second direction from one side, in the second direction, of a 2nth one of the plurality of finger-shaped branches extend towards each other, the 2n-1th finger-shaped branch, the 2nth finger-shaped branch, the second finger-shaped portions extending respectively from the 2n-1th finger-shaped branch and the 2nth finger-shaped branch towards each other, and a segment of the second electrode body between the 2n-1th finger-shaped branch and the 2nth finger-shaped branch in the second direction constitute a second electrode unit of the second electrode, and n is a positive integer;
in each of the plurality of first electrodes, the plurality of first finger-shaped portions extend towards opposite directions in the second direction from both sides, in the second direction, of the first electrode body respectively, ones of the plurality of first finger-shaped portions extending towards the opposite directions from the first electrode body and forming an interdigital structure together with the second finger-shaped portions of the second electrode unit of the second electrode, and a segment of the first electrode body between the ones of the plurality of first finger-shaped portions in the second direction constitute a first electrode unit of the first electrode; and the first electrode unit and the second electrode unit forming the interdigital structure constitute a sub-touch unit, and in each sub-touch unit, only one bridging structure is disposed.

18. The touch screen of claim 1, further comprising:

a light emitting unit comprising an organic light-emitting diode, wherein the bridging structure is disposed between the first and second electrodes and the light emitting unit; or a light emitting unit comprising an organic light-emitting diode, wherein the bridging structure is disposed on a side of the plurality of first electrodes and the plurality of the second electrodes away from the light emitting unit.

19. A display apparatus comprising:

the touch screen according to claim 1.

* * * * *